US012078163B2

(12) United States Patent
Bolt

(10) Patent No.: US 12,078,163 B2
(45) Date of Patent: Sep. 3, 2024

(54) PUMP WEAR DETECTION SYSTEM

(71) Applicant: NATIONAL OILWELL VARCO, L.P., Houston, TX (US)

(72) Inventor: Travis Lee Bolt, Conroe, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 99 days.

(21) Appl. No.: 17/660,069

(22) Filed: Apr. 21, 2022

(65) Prior Publication Data
US 2023/0340954 A1 Oct. 26, 2023

(51) Int. Cl.
F04B 51/00 (2006.01)
E21B 43/26 (2006.01)
F16K 37/00 (2006.01)

(52) U.S. Cl.
CPC .......... F04B 51/00 (2013.01); E21B 43/2607 (2020.05); F04B 2201/0603 (2013.01); F04B 2203/0201 (2013.01); F04B 2203/0207 (2013.01); F04B 2203/0603 (2013.01); F16K 37/0041 (2013.01)

(58) Field of Classification Search
CPC .............. F04B 51/00; F04B 2201/0603; F04B 2203/0201; F04B 2203/0207; F04B 2203/0603; F16K 37/0041; E21B 43/2607
See application file for complete search history.

(56) References Cited

U.S. PATENT DOCUMENTS

| 9,605,886 B2* | 3/2017 | West | F25B 49/022 |
| 10,584,698 B2* | 3/2020 | Haddad | F04B 43/026 |
| 2016/0084271 A1* | 3/2016 | Gomm | F15B 20/008 60/466 |
| 2016/0195082 A1* | 7/2016 | Wiegman | F04B 23/04 417/63 |
| 2018/0230991 A1* | 8/2018 | Andrich | F04B 39/1073 |
| 2023/0313639 A1* | 10/2023 | Urdaneta | E21B 47/06 166/372 |

FOREIGN PATENT DOCUMENTS

KR 102401402 B1 * 5/2022
WO WO 2015/066219 A1 * 5/2015

* cited by examiner

Primary Examiner — Charles G Freay
(74) Attorney, Agent, or Firm — Schwegman Lundberg & Woessner, P.A.

(57) ABSTRACT

A pump monitoring system may include a sensor for monitoring a parameter of a pump system. The sensor may include at least one of an ammeter in electrical communication with an electric motor driving a pump and a torque sensor on a drive shaft that drives a pump. The system may also include a controller in data communication with the sensor to receive sensor data. The controller may be configured to assess the performance of the respective pump in one or more ways. At least one of the one or more ways may include reliance on the sensor data from only one sensor to identify valve or seat wear or failure. Alternatively or additionally, at least one of the one or more ways may identify valve or seat wear or failure without reliance on pump output pressure.

18 Claims, 5 Drawing Sheets

PUMP WEAR DETECTION SYSTEM

TECHNOLOGICAL FIELD

The present application relates to wear detection of pumps. More particularly, the present application relates to detection of valve and/or seat wear or other failures of pumps. Still more particularly, the present application relates to detection of valve and seat wear or other failures of pumps driven by electric motors and used in a frac fleet or other combined fluid generation system.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Hydraulic fracturing operations can involve a low-pressure fluid supply system that may include a blending tub for the addition of additives and proppant. The prepared frac fluid may be delivered at low-pressure to a system of pumps. The pumps may each receive low-pressure fluid and generate a fluid flow that is combined through piping system and directed downhole into a well. As fluid flow is resisted within the well, the fluid flow from the system of pumps may develop a high pressure due to the continued fluid flow from the system of pumps. The high pressure in the well and in the surrounding formation may fracture the formation providing pathways for deposits within to flow into the well after the frac operation is complete. Moreover, the proppant in the frac fluid may remain in the pathways to hold them open when the frac pressure is relieved.

Due to a variety of factors including multiple pumps contributing to the fluid flow and pressure, the high noise and vibration of the system, and other obscuring issues, pump wear and even pump failures may be difficult to detect in this environment. For example, with respect to multiple pumps, where one pump is wearing out or experiencing a failure, the pressure of the overall system may drop only slightly. Even if this slight drop is detected, identifying which pump is causing it is difficult due to all of the pumps contributing to the pressurized fluid. Undetected failures can cause a failure of the system preventing its ability to develop suitable pressures to frac a well and potentially damaging other equipment. In an effort to avoid these situations, relatively conservative approaches to preventative maintenance may be performed. For example, particular aspects of the pumps, such as valve and seats, may be replaced well ahead of their useful life creating inefficiencies in the maintenance process including excessive down time and part costs.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more examples, a pump monitoring system may include a sensor for monitoring a parameter of a pump system. The sensor may include at least one of an ammeter in electrical communication with an electric motor driving a pump and a torque sensor on a drive shaft that drives a pump. Where both an ammeter and a torque sensor are provided, the pump may be the same pump or a different pump. The system may also include a controller in data communication with the sensor to receive sensor data. The controller may be configured to assess the performance of the respective pump in one or more ways. At least one of the one or more ways may include reliance on the sensor data from only one sensor to identify valve or seat wear or failure.

In one or more other or additional examples, a method of assessing pump performance may include receiving sensor data at a controller from at least one of an ammeter in electrical communication with an electric motor driving a pump and a torque sensor on a drive shaft that drives a pump. The method may also include, at the controller, assessing the performance of the respective pump in one or more ways. At least one of the one or more ways may include relying on the sensor data from only one sensor to identify valve or seat wear or failure.

In one or more other or additional examples, a pump monitoring system may include a sensor for monitoring a parameter of a pump system. The sensor may include at least one of an ammeter in electrical communication with an electric motor driving a pump and a torque sensor on a drive shaft that drives a pump. The system may also include a controller in data communication with the sensor to receive sensor data. The controller may be configured to assess the performance of the respective pump in one or more ways, wherein at least one of the one or more ways identifies valve or seat wear or failure without reliance on pump output pressure.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in one or more embodiments, relates to a pump wear detection system. In particular, the system may monitor one or more parameters associated with the pump and may identify a wearing, worn out, or failing valve and/or seat based on the parameter. In one or more examples, the system may monitor a change in the value of a parameter and may identify pump wear based on the change in value. In one or more other examples, the system may monitor a standard deviation or other statistical variable relating to the variability of the parameter and may rely on the statistical variable to identify pump wear. The particularly selected parameters, and/or the statistical variables related to them, may be selected based on their particular relationship to pump performance and/or their particular relationship to wear of the pump. The particular parameters identified herein are not commonly used, on their own, to indicate wear of a pump, but the present application explains how particular changes in these parameters are indicative of pump wear. Moreover, and notably, the parameters may not necessarily include pump output pressure, which may otherwise be used for purposes of determining pump efficiency, for example.

Figure 1:
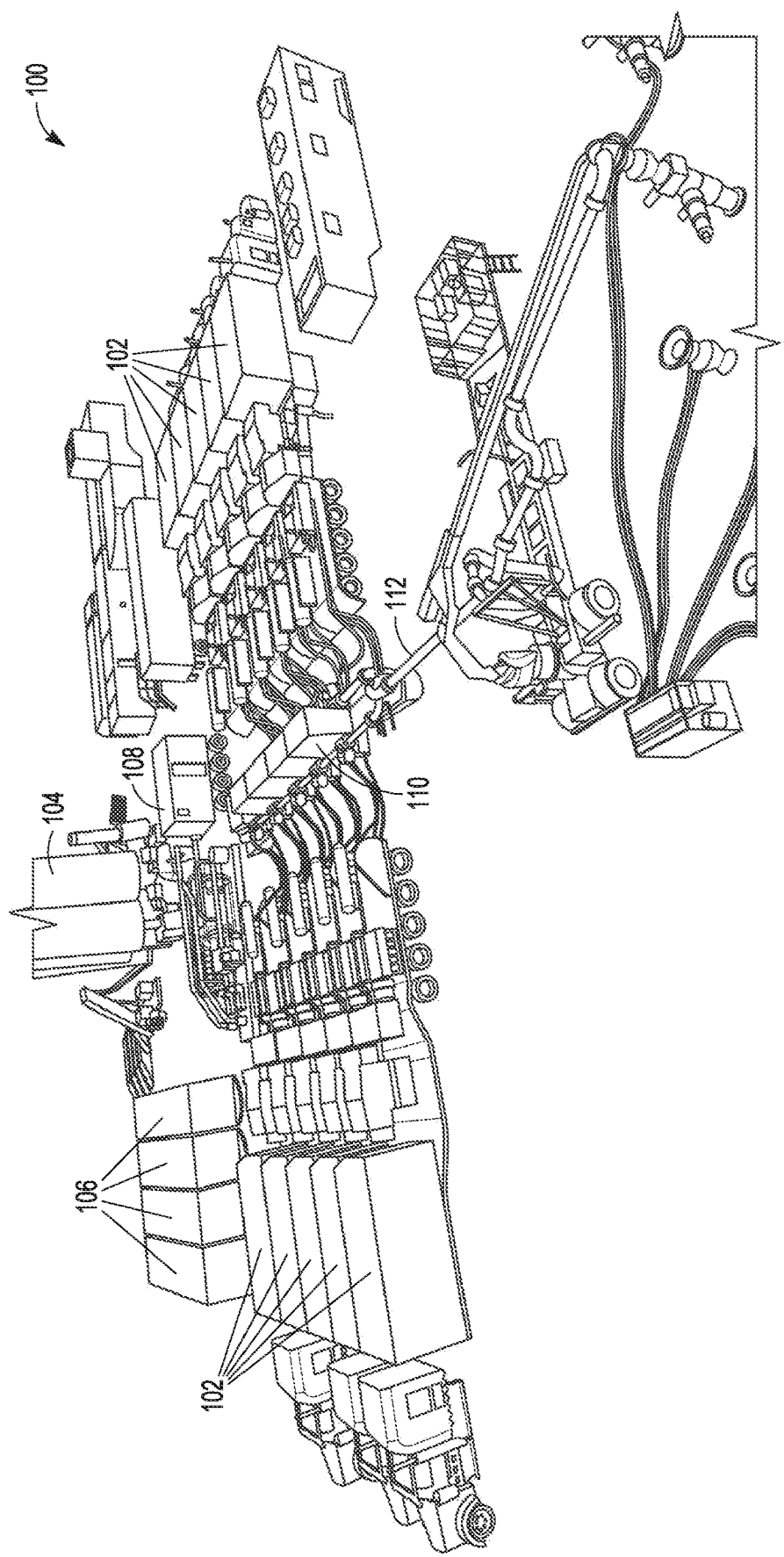
FIG. 1 is a perspective view of frac operation with a pump wear detection system, according to one or more examples.

FIG. 1 shows a frac system 100 including a fleet of frac pump assemblies 102 and, in particular, a fleet of electrically powered frac pump assemblies 102. The frac system 100 may be configured to produce a frac fluid, pressurize the frac fluid, and delivery the high-pressure fluid to a formation in the ground via a well. The system 100 may include a proppant supply system 104, an additive supply system 106, a blending system 108, a fluid and electrical power manifold 110, a fleet of electrically powered frac pump assemblies 102, and a wellhead delivery system 112. The proppant supply system 104 may store proppant (e.g., sand), and deliver metered amounts of proppant to the blending system 108. The additive system 106 may deliver metered amounts of additive to the blending system 108. The blending system 108 may combine the proppant and additive with water to create a frac fluid and deliver the frac fluid to the fluid and electrical power manifold 110. The manifold may supply the electrically powered frac pump assemblies 102 with power and with the frac fluid at relatively low pressure and the frac pump assemblies 102 may generate high pressure frac fluid by pumping the fluid back to the manifold 110. The manifold may combine the high-pressure fluid from the several frac pump assemblies 102 and the wellhead delivery system 112 may carry the combined high-pressure fluid to the wellhead.

Figure 2:
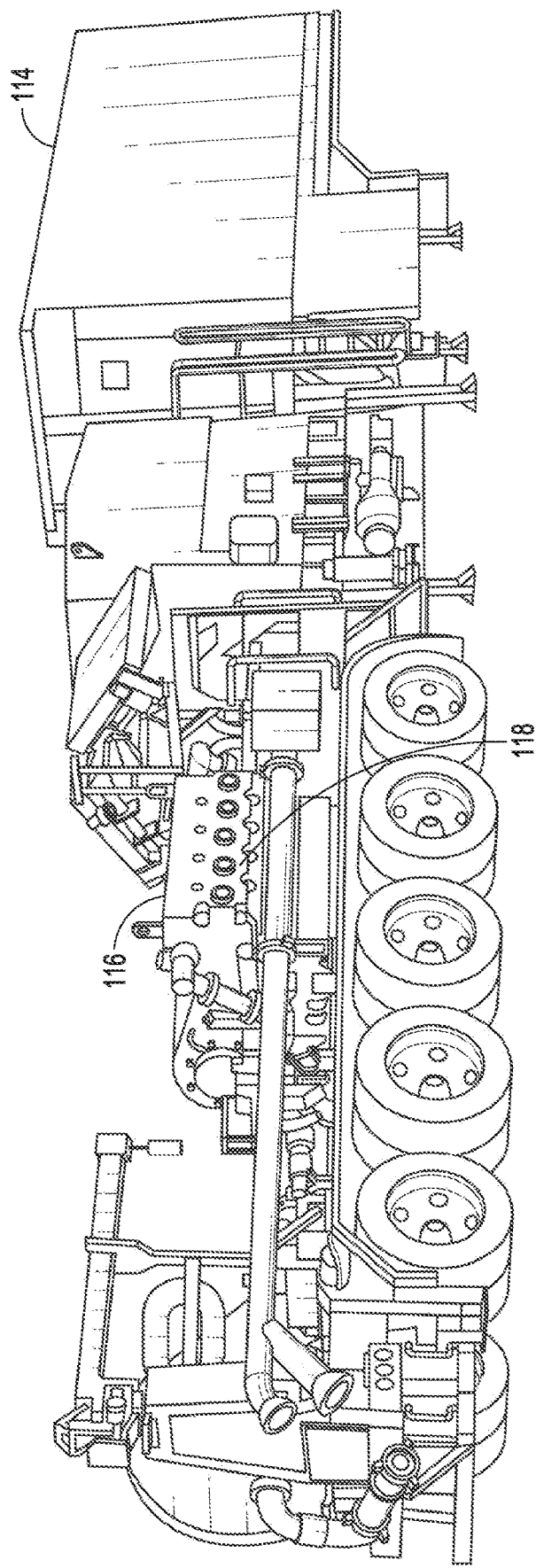
FIG. 2 is a perspective view of a frac pump trailer of the frac operation of FIG. 1, according to one or more examples.

FIG. 2 shows a perspective view of an electrically powered frac pump assembly 102 of the system of FIG. 1. The frac pump assembly 102 may be configured to receive a respective flow of low pressure frac fluid from the manifold 110 of the system 100 and may be further configured to deliver high pressure fluid back to the manifold 110 to be combined with high-pressure fluid from the other frac pump assemblies 102 in the system. In one or more examples, the frac pump assembly 102 may include a control system or house 114, a variable frequency drive (VFD) 115 (not shown, see FIG. 3), a motor 116, and a pump 118. The control system or house 114 may house the WU and/or other electrical or computing systems for operating the frac pump assembly 102. The control system or house 114 and/or the computing systems therein may be in electrical and/or data communication with a control or data van that is monitoring and/or operating the whole frac system 100. The VFD may be used to operate the motor 116 to control the speed of the motor 116 and, in turn, control the operation of the pump 118. In one or more examples, the frac pump assembly 102 may include a controller 120 (see FIG. 3) for monitoring wear of the pump 118 within the assembly. The controller 120 may be a separate computing component or it may be part of a computing system within the control house 114 and/or it may be incorporated into the VFD, for example.

Figure 3:
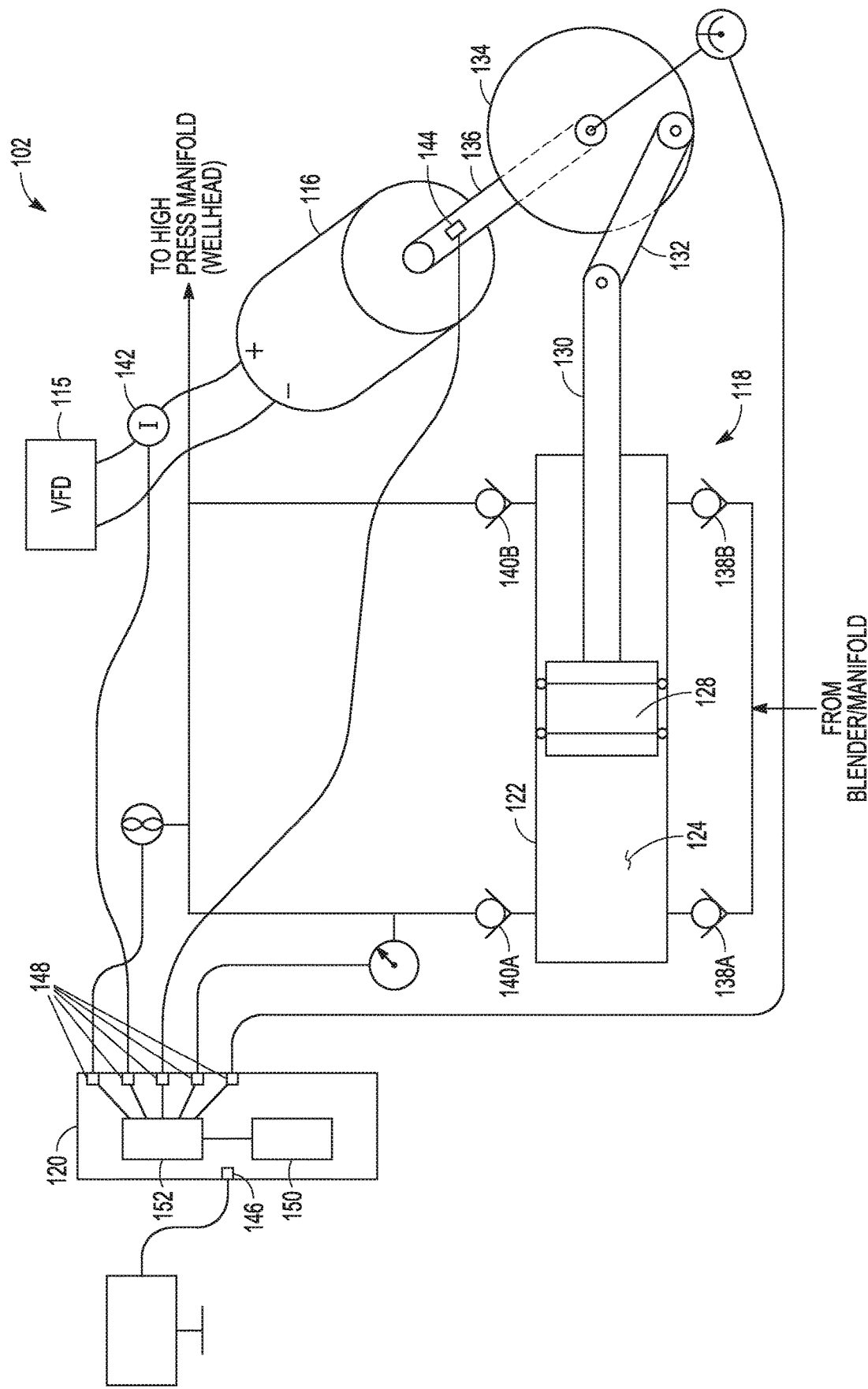
FIG. 3 is a hydraulic and control schematic of a pump wear system of the pump trailer and/or frac operation, according to one or more examples.

FIG. 3 is a schematic diagram of a frac pump assembly 102 having a controller 120 for monitoring wear of the pump 118 within the assembly. The controller 120 may be adapted to monitor one or more parameters of the pump operation and may be particularly adapted to identify wear of the pump. The schematic diagram shows schematic versions of the parts of the frac pump assembly 102 previously shown in FIG. 2. That is, for example, as shown, the frac pump assembly may include a VFD 115, an electric motor 116, and a pump 118. As shown, the pump 118 may be adapted to convert rotational motion from the motor 116 to longitudinal reciprocating motion of a shaft. The pump may be a positive displacement pump, for example. As shown, the positive displacement pump may include a cylinder 122 with a chamber 124 defining a stroke length 126, a piston 128 arranged in the chamber 124 and configured to reciprocate through the chamber 124 through the stroke length 126, and a piston rod 130 coupled to the piston 128 and extending out an end of the cylinder 122. The piston rod 130 may be secured with a linkage 132 to a flywheel 134, for example, that is driven by the motor 116 via a drive shaft 136. As the drive shaft 136 and flywheel 134 from the motor 116 rotate, the linkage 132 may drive the piston rod 130 and piston 128 back and forth in the cylinder chamber 124.

As shown, the cylinder 122 may include a pair of intake valves 138A/B, one on either side of the piston 128, and a pair of output valves 140A/B, one on either side of the piston 128. As the piston 128 moves to the left in FIG. 3, fluid within the portion of the chamber 124 left of the piston 128 may be driven out of the left output valve 140A and fluid from the manifold 110 may be drawn into the portion of the chamber 124 right of the piston 128 and through the intake valve 138B right of the piston 128. As the piston 128 reaches the left most side of the chamber 124, it may return and move toward the right in FIG. 3. As the piston 128 moves to the right, fluid within the portion of the chamber 124 right of the piston 128 may be driven out of the right output valve 140B and fluid from the manifold 110 may be drawn into the portion of the chamber 124 left of the piston 128 through the intake valve 138A left of the piston 128. As such, when the piston 128 is moving to the right and/or to the left it may be drawing fluid into a trailing portion of the chamber 124 and driving fluid out of a leading portion of the chamber 124.

The intake and output valves 138A/B/140A/B are shown as check valves in the attached schematic. However, in one or more examples, the valves may be mechanically actuated valves driven by a timing belt or other mechanical control. Still other types of valves may be provided. In any of the above cases, the valves may establish a seal between a respective fluid flow line and the chamber 124 when the valve is closed and, when open, may place the fluid flow line in fluid communication with the chamber 124. As described above, proper function of the pump 118 may depend on proper sealing of the valves. For example, if the left intake valve 138A begins to wear and does not properly seal, when the piston 128 moves to the left, some or all of the pressurized fluid intended to flow out of the left output valve 140A may actually flow upstream through the intake valve 138A reducing the effectiveness of the pump. Similarly, if the left output valve 140A begins to wear and does not properly seal, when the piston 128 moves to the right, high pressure fluid may leak upstream through the left output valve 140A reducing the effectiveness of the pump 118. The same may be true if the right intake 138B and/or output valves 140B wear and do not properly seal. The valves may seal based on seating of a moving portion of the valve in a seat. If the moving portion of the valve or the seat experience wear, the seal may become less effective. Due to the abrasive nature of the frac fluid produced at the blender 108, the valve and seat conditions of the pumps 118 may have a tendency to wear out more quickly than they otherwise would. It is to be appreciated that while a single cylinder pump 118 has been shown, multiple cylinders may be provided as part of each pump in the system. For example, triplex, quintuplex, or other pumps with multiple cylinders may be provided.

As discussed above, the output pressure of the flow lines leading to the high-pressure manifold and to the wellhead may be based on the several pump assemblies 102 in the frac system 100 and, as such, relying on the output pressure to identify issues with pump performance may not be very reliable. That is, pressure generation from the several other pump assemblies 102 in the system may mask issues with one of the pumps in the system. In view of this, the present system 100 may have a controller 120 adapted to monitor pump performance without regard to the pump pressure being generated. That is, the controller 120 may be configured to identify valve or seat wear or failure without reliance on pump output pressure. To this end, the system 100 may include one or more sensors configured to capture other system information allowing for assessment of pump performance. In one or more examples, the system may include an ammeter 142 and/or a torque sensor 144. The ammeter 142 may be configured to determine the amperage flowing to the motor 116 and the torque sensor 144 may be adapted to determine the torque on the drive shaft 136 driving the pump 118. That is, for example, the torque sensor 144 may be in the form of a strain gauge on the drive shaft 144. Each sensor may be in data communication with the controller 120 to allow for assessment of pump performance. With respect to the ammeter for determining amperage flowing to the motor, the system or method may assume the motor is functioning as designed and/or intended such that amperage fluctuations or changes in the current are assumed to relate to the pump function and not the motor function.

FIG. 3 shows the controller 120 in data communication with the torque sensor 144 and the ammeter 142. The controller 120 may be configured to receive input from one or more of the ammeter 142 and the torque sensor 144 and assess pump performance based on the input. The input from the ammeter 142, the torque sensor 144, or other sensor or sensors may be communicated via wires or wirelessly communicated to the controller 120. The controller 120 may be configured to determine if the pump 118 is experiencing valve/seat wear or a failure of a valve/seat within the pump 118 based on the electrical current and/or the torque. In one or more examples, the controller 120 may determine if the pump 118 is experiencing valve/seat wear or a failure based solely on the electrical current or solely on the torque. The controller 120 may be a computing component including one or more outputs 146, one or more inputs 148, a computer-readable storage medium 150, and a processor 152. The controller 120 may be configured to receive input data from the ammeter 142, the torque sensor 144, and/or other sensors as shown. The controller 120 may store the input data in memory (e.g., RAM, ROM, or other memory) and may perform one or more methods using the data such as the method or methods of assessing pump performance described in more detail below. In one or more examples, the controller 120 may display ongoing readings of the ammeter 142 and/or the torque sensor 144 such as those shown in FIG. 4, for example. In one or more examples, based on the method described below, the controller 120 may issue an alert when the controller 120 identifies wear or failure of a valve or seat based on the sensor data. For example, the controller 120 may monitor the value of the current or the torque and when the value triggers a particular threshold, the controller 120 may activate a light, a sound alarm, a display indication, or other alert. In one or more other examples, the controller 120 may monitor the variability of the current and/or the torque and when the variability in the current and/or torque triggers a particular threshold variance, the controller 120 may issue an alert. Still other aspects of the ongoing current and/or torque readings may be used to identify poor performance of a pump, wear of the pump, and/or failure of the pump or valves and seats within the pump. Moreover, other sensor values may also be used.

The system 100 described herein may be advantageous due to its ability to identify poor pump performance, particularly as it relates to wear or failure of a valve and/or seat. The system 100 may be particularly advantageous as being able to do so based on a single variable of the pump 118 and/or one or more variables that do not include output pressure. That is, the present inventors have identified particular patterns of variability of single variables (e.g., current or torque) and have realized, first, that these patterns can be related to valve and seat wear/failure and, second, they have realized how these patterns can be related to valve and seat wear/failure. Still further, the present inventors have stumbled upon the surprising result of the high variance in these values during times of pump failure. As such, while the change in the values of these variables may be relatively less drastic, the increased variance in these values during a pump failure is very identifiable and allows for readily identifying pump wear or failure. Even further, the present inventors have stumbled upon the more instantaneous reflection of valve and seat failure by the variance in torque and the much higher variability than current, which provides for an ability to even more readily identify pump wear or failure.

It is to be appreciated that while the present system 100 has been said to identify valve/seat wear or failure without reliance on pressure, this is not to say that pressure sensors and determinations based on pressure may not be provided. Rather, the controller 120 may rely on pressure and/or other sensor values such as motor speed or drive shaft speed or fluid flow rate for various purposes and potentially even for purposes of assessing pump performance or even valve/seat wear or failure. However, alternatively or additionally, the system may be configured to identify valve/seat wear or failure without reliance on pressure and/or based on a sole sensor value such as, for example, current or torque. That is, while some processes of the controller 120 may rely on pressure values to perform pump assessment, other separate processes may involve reliance on a sole sensor value and be capable of identifying valve/seat wear or failure based on that sole sensor value. Still further, it is to be appreciated that while the present application has been focused on electrical frac systems, measurements of torque are unrelated to the nature of the motive power being provided to the pump. That is, while an electric motor has been shown and described, nothing should be construed to exclude the use of combustion engines or other source of motive power other than electrical motors. This is particularly true, where the parameter relied on for identifying wear/failure is torque. That is, torque may be measured regardless of the nature of the motive power driving the pump.

Finally, and notwithstanding that the present application discusses an ammeter in electrical communication with a motor, the present application is focused on valve/seat wear or failure of a pump and, specifically, is not focused on any diagnosis of the motor driving the pump. Rather, the motor is assumed to be functioning as designed or intended.

Figure 4:
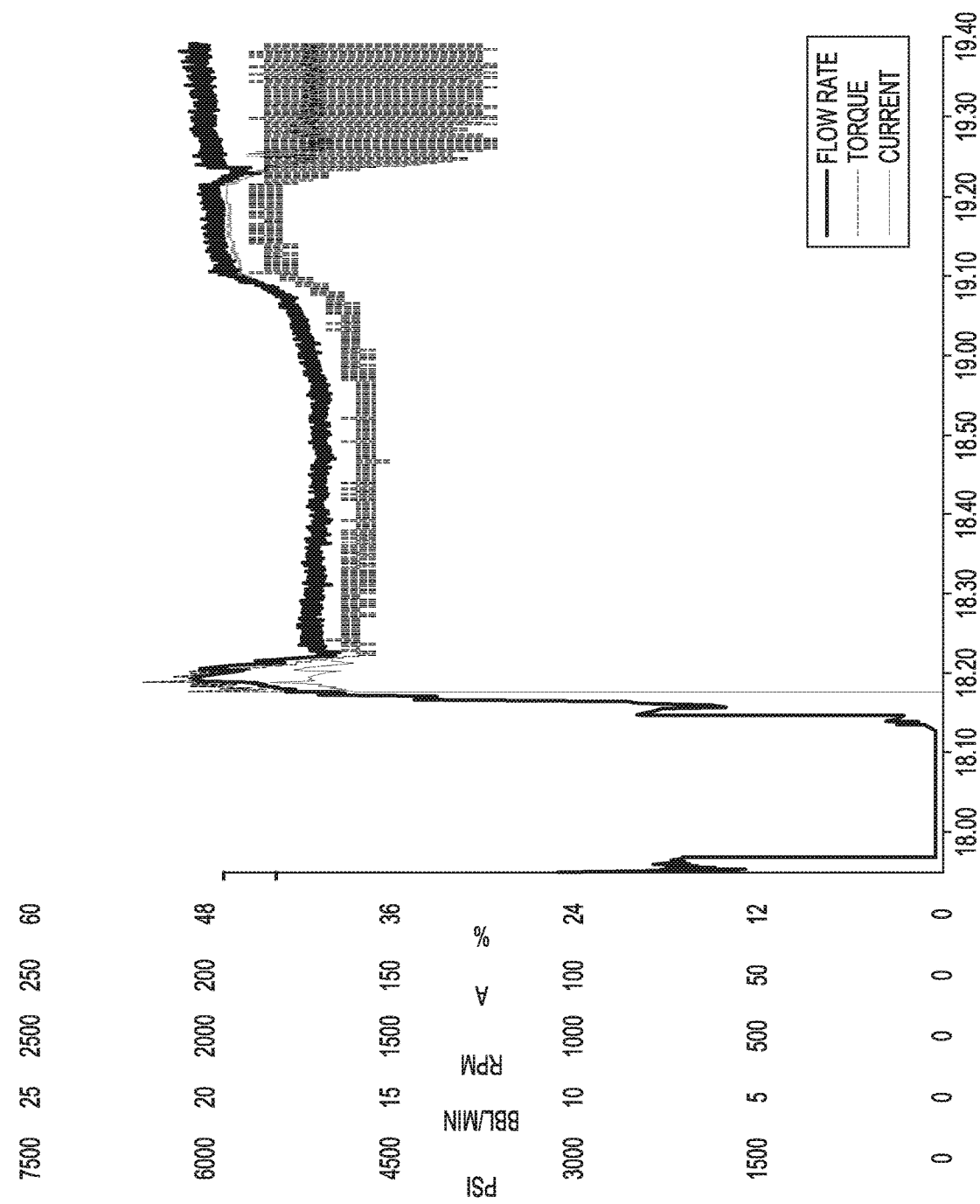
FIG. 4 is a display of one or more parameters monitored by a controller, according to one or more examples.
Figure 5:
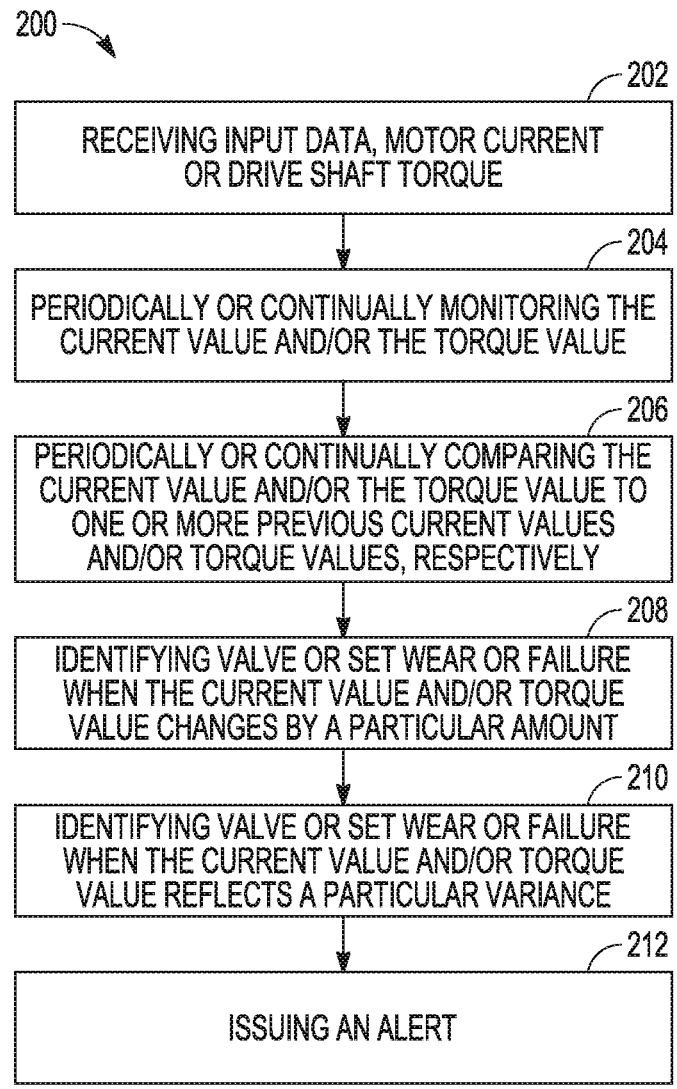
FIG. 5 is a diagram depicting a method of assessing pump performance, according to one or more examples.

In one or more examples, a method of assessing pump performance 200 may be provided. As shown in FIG. 5, the method 200 may include receiving input data 202 such as motor current or drive shaft torque. The method may also include periodic or continual monitoring of the current value or the torque value 204. The method may also include periodic or continual comparing of the current value or the torque value to one or more previous current values or torque values, respectively 206. The method may also include identifying valve or seat wear or failure when the current value or torque value changes by a particular amount 208. For example, and as depicted in FIG. 4, when the current value or torque value changes by approximately 3% to approximately 20%, or by approximately 5% to approximately 15%, or by approximately 8-10%, the method may include issuing an alert such as one or more of the alerts described above. The method may also include identifying valve or seat wear or failure when the current value or torque value reflects a particular variance 210. For example, the method may also include periodically or continually calculating a standard deviation or other measure of variance. In the case of current, normal operating variance of the current may have a standard deviation ranging from approximately 0% to approximately 5%. However, and as shown in FIG. 4, when a valve/seat wears excessively or fails, the standard deviation may increase and range from approximately 3% to approximately 30%, or approximately 5% to approximately 20%. Similarly, and in the case of torque, normal operation may have a variance in the torque with a standard deviation ranging from approximately 0% to approximately 5%. However, and as shown in FIG. 4, when a valve/seat wears excessively or fails, the standard deviation may increase and range from approximately 3% to approximately 50% or from approximately 5% to approximately 40%. When these conditions occur, the controller may issue an alert such as one or more of the alerts described above 212.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A pump monitoring system, comprising:
   a sensor configured for monitoring a parameter of a pump and generating sensor data corresponding to the parameter, the sensor comprising: (1) an ammeter in electrical communication with an electric motor driving the pump, or (2) a torque sensor on a drive shaft that drives the pump; and
   a controller in data communication with the ammeter or the torque sensor to receive the sensor data, the controller configured to assess the performance of the pump in one or more ways, wherein at least one of the one or more ways includes reliance on the sensor data from only one sensor to identify at least one of wear or wear-related mechanical failure of at least one of a valve or a valve seat, wherein the controller is configured to issue an alert when at least one of wear or wear-related mechanical failure of at least one of the valve or the valve seat is identified.

2. The system of claim 1, wherein the sensor is an ammeter configured to measure a current flowing to the electric motor.

3. The system of claim 2, wherein the controller is configured to identify at least one of wear or wear-related mechanical failure of at least one of the valve or the valve seat based on a change in the current.

4. The system of claim 3, wherein the change in the current for the controller to identify at least one of wear or wear-related mechanical failure of at least one of the valve or the valve seat comprises a change ranging from 3% to 20% as compared to a previous current value.

5. The system of claim 2, wherein the controller is configured to identify at least one of wear or wear-related mechanical failure of at least one of the valve or the valve seat based on a change in a variability of the current.

6. The system of claim 5, wherein the variability of the current is defined by a standard deviation of the current over between 1 and 100 revolutions of the pump, and the change in variability for the controller to identify at least one of wear or wear-related mechanical failure of at least one of the valve or the valve seat includes a change of the standard deviation from a first range of 0% to 5% representing a normal operating variance to a second range of 5% to 20%.

7. The system of claim 1, wherein the sensor is a torque sensor configured to measure a torque in the drive shaft.

8. The system of claim 7, wherein the controller is configured to identify at least one of wear or wear-related mechanical failure of at least one of the valve or the valve seat based on a change in the torque.

9. The system of claim 8, wherein the change in the torque for the controller to identify at least one of wear or wear-related mechanical failure of at least one of the valve or the valve seat comprises a change ranging from 3% to 20% as compared to a previous torque value.

10. The system of claim 7, wherein the controller is configured to identify at least one of wear or wear-related mechanical failure of at least one of the valve or the valve seat based on a change in a variability of the torque.

11. The system of claim 10, wherein the variability of the torque is defined by a standard deviation of the torque over between 1 and 100 revolutions of the pump, and the change in variability for the controller to identify at least one of wear or wear-related mechanical failure of at least one of the valve or the valve seat includes a change of the standard deviation from a first range of 0% to 5% representing a normal operating variance to a second range of 5% to 40%.

12. The system of claim 7, wherein the drive shaft is a drive shaft of an electric motor.

13. The system of claim 7, wherein the drive shaft is a drive shaft of a combustion engine.

14. A method of assessing pump performance, comprising:
  receiving sensor data at a controller from:
    (1) an ammeter in electrical communication with an electric motor driving a pump; or
    (2) a torque sensor on a drive shaft that drives the pump;
  at the controller, assessing the performance of the pump in one or more ways, wherein at least one of the one or more ways includes relying on the sensor data from only one sensor to identify at least one of wear or wear-related mechanical failure of at least one of a valve or a valve seat; and
  issuing an alert when at least one of wear or wear-related mechanical failure of at least one of the valve or the valve seat is identified.

15. The method of claim 14, wherein the only one sensor is an ammeter measuring current flow to the electric motor and the controller identifies at least one of wear or wear-related mechanical failure of at least one of the valve or the valve seat based on at least one of:
  a change in the current flow; or
  a change in a variability of the current flow.

16. The method of claim 14, wherein the only one sensor is a torque sensor measuring torque in the drive shaft and the controller identifies at least one of wear or wear-related mechanical failure of at least one of the valve or the valve seat based on at least one of:
  a change in the torque; or
  a change in a variability of the torque.

17. A pump monitoring system, comprising:
  a sensor for monitoring a parameter of a pump and generating sensor data corresponding to the parameter, the sensor comprising: (1) an ammeter in electrical communication with an electric motor driving the pump; or (2) a torque sensor on a drive shaft that drives the pump; and
  a controller in data communication with the ammeter or torque sensor to receive the sensor data, the controller configured to assess the performance of the respective pump in one or more ways, wherein at least one of the one or more ways identifies at least one of wear or wear-related mechanical failure of at least one of a valve or a valve seat without reliance on pump output pressure, wherein the controller is configured to issue an alert when at least one of wear or wear-related mechanical failure of at least one of the valve or the valve seat is identified.

18. The system of claim 17, wherein the sensor is a torque sensor configured to measure torque in the drive shaft.

* * * * *